United States Patent
Davis

[11] Patent Number: 5,533,848
[45] Date of Patent: Jul. 9, 1996

[54] PAYLOAD TIE-DOWN SYSTEM

[76] Inventor: Oliver M. Davis, 7757 Jamestown, Fishers, Ind. 46038

[21] Appl. No.: 367,899

[22] Filed: Jan. 3, 1995

[51] Int. Cl.⁶ ..................................... B60P 7/08
[52] U.S. Cl. .......................... 410/105; 410/104; 410/108
[58] Field of Search ........................... 410/101, 104–106, 410/108, 110, 115, 116; 24/68 CD, 115 K, 265 CD; 248/499, 503

[56] References Cited

U.S. PATENT DOCUMENTS

| | | | |
|---|---|---|---|
| 2,891,490 | 6/1959 | Elsner | 24/265 CD X |
| 3,212,457 | 10/1965 | Looker . | |
| 3,344,749 | 10/1967 | Barr et al. | 410/105 |
| 3,698,678 | 10/1972 | Bowers | 410/105 |
| 3,713,616 | 1/1973 | Bowers | 410/105 |
| 4,020,770 | 5/1977 | Mclennan et al. . | |
| 4,085,684 | 4/1978 | McLennan et al. . | |
| 4,850,769 | 7/1989 | Matthews | 410/105 |
| 4,936,724 | 6/1990 | Dutton | 410/115 X |
| 4,954,031 | 9/1990 | Geeck, III | 410/110 |
| 5,259,711 | 11/1993 | Beck | 410/101 X |

Primary Examiner—Karen B. Merritt
Assistant Examiner—Stephen Gordon
Attorney, Agent, or Firm—Locke Reynolds

[57] ABSTRACT

A tie-down system is disclosed for securing a payload carried by a transportation device such as a vehicle, aircraft, watercraft, or to a stationary structure. A half-round rod track having a longitudinal channel and slot is attached to the transportation device, and a carriage is slidably movable withing the channel and slot. The carriage is secured to the track at various positions by a S-shaped hook disposed through a hole in the carriage aligned with one of a plurality of notches in the track.

15 Claims, 4 Drawing Sheets

PAYLOAD TIE-DOWN SYSTEM

BACKGROUND OF THE INVENTION

1. Field of the Invention

The present invention generally relates to systems for tying down and securing payloads carried by vehicles, aircraft, watercraft, and the like, or mounted to walls or other stationary structures, and more particularly concerns systems utilizing tracks having slidable carriages that are capable of securely holding payloads of various sizes, shapes and weights, and that may be factory installed or installed as after-market accessories.

2. Description of the Prior Art

The array of systems that may be used to tie-down and secure payloads carried by vehicles, aircraft, watercraft, and stationary structures includes those systems having tracks upon which carriages slide, with means to temporarily secure the carriages at various positions along said tracks, and having means to attach straps, ropes or cords between the carriages to secure payloads.

The tracks of such systems may be rectangular in cross-section and formed of relatively thin metal stock bent to define a channel, such as described by U.S. Pat. Nos. 3,713,616, and 3,698,678, or formed of solid rectangular stock in which a channel has been extruded, such as described by U.S. Pat. No. 4,850,769. In addition, the tracks of such systems may be tubular, having a relatively thin wall circular cross section, such as described by U.S. Pat. No. 3,698,678, or, may be an irregular shape in which a channel has been extruded, such as those described by U.S. Pat. Nos. 4,020,770 and 4,085,684. In addition, the internal channel of the track may be of rectangular cross-section with an opening to a side of the track, circular in cross-section with an opening to a side of the track, or may be of oblong cross-section with an opening to a side of the track.

Unfortunately, the tracks of such existing systems may have insufficient structural strength to withstand the forces produced when a heavy payload is secured, with the carriages acting to pull out of relatively thin walled tracks, to distort the tracks to the point of inoperativeness, or to cause such stresses upon the tracks that the structural integrity of the tracks is compromised by way of fissures or cracks, eventually causing track breakage.

The carriages, the means to temporarily secure the carriages at various positions along the tracks, and the means to attach straps, ropes or cords between the carriages to secure payloads may be integrated into a single unit having relatively complex internal structure, such as described by U.S. Pat. Nos. 3,212,457, 4,020,770, 4,085,684, and 4,850,769. In such systems, the cost of production of the relatively complex units is significant, and the chances of mechanical breakdown or malfunction is increased. Other systems have the carriages, the means to temporarily secure the carriages, and the means to attach straps, ropes or cords between the carriages in the form of multiple distinct elements, such as described by U.S. Pat. Nos. 3,698,678 and 3,713,616.

Despite the availability of such systems, there exists a need in the art for a payload tie-down system that is capable of use as both a factory installed system and an after-market accessory for a wide variety of vehicles, aircraft, watercraft and stationary structures, is capable of repeated and long use to securely hold large and heavy payloads of various sizes and shapes, yet has a minimum number of structurally simple components, is easily used and maintained, and is inexpensive to produce.

SUMMARY OF THE INVENTION

In order to aid in the understanding of the present invention, it can be stated in essentially summary form that it is directed to a payload tie-down system of the type having tracks utilizing slidable carriages that is capable of securely holding payloads of various sizes, shapes and weights carried by vehicles, aircraft, watercraft and stationary structures, yet is capable of being factory installed or installed as an after-market accessory.

It is an object of the present invention to provide a payload tie-down system that is capable use with a wide variety of vehicles, aircraft, watercraft and stationary structures.

It is another object of the present invention to provide a payload tie-down system that is capable use with a wide variety payloads of various sizes, shapes, and weights.

It is another object of the present invention to provide a payload tie-down system having a minimum number of structurally simple components.

It is another object of the present invention to provide a payload tie-down system that is capable of rapid and easy installation, use and maintenance.

It is another object of the present invention to provide a payload tie-down system that has sufficient structural strength so as to be capable of long use with heavy payloads without structural failure.

It is another object of the present invention to provide a payload tie-down system that is capable of being factory installed during the manufacture of a vehicle, aircraft, watercraft or stationary structure.

It is still another object of the present invention to provide a payload tie-down system that is capable of being quickly and easily installed as an after-market accessory subsequent to the manufacture of a vehicle, aircraft, watercraft, or stationary structure.

It is yet another object of the present invention to provide a payload tie-down system that is inexpensive to produce.

Further objects and advantages of the present invention will be apparent from a study of the following portion of the specification, the claims, and the attached drawings.

DESCRIPTION OF THE PREFERRED EMBODIMENTS

The following portion of the specification, taken in conjunction with the drawings, sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Figure 1:
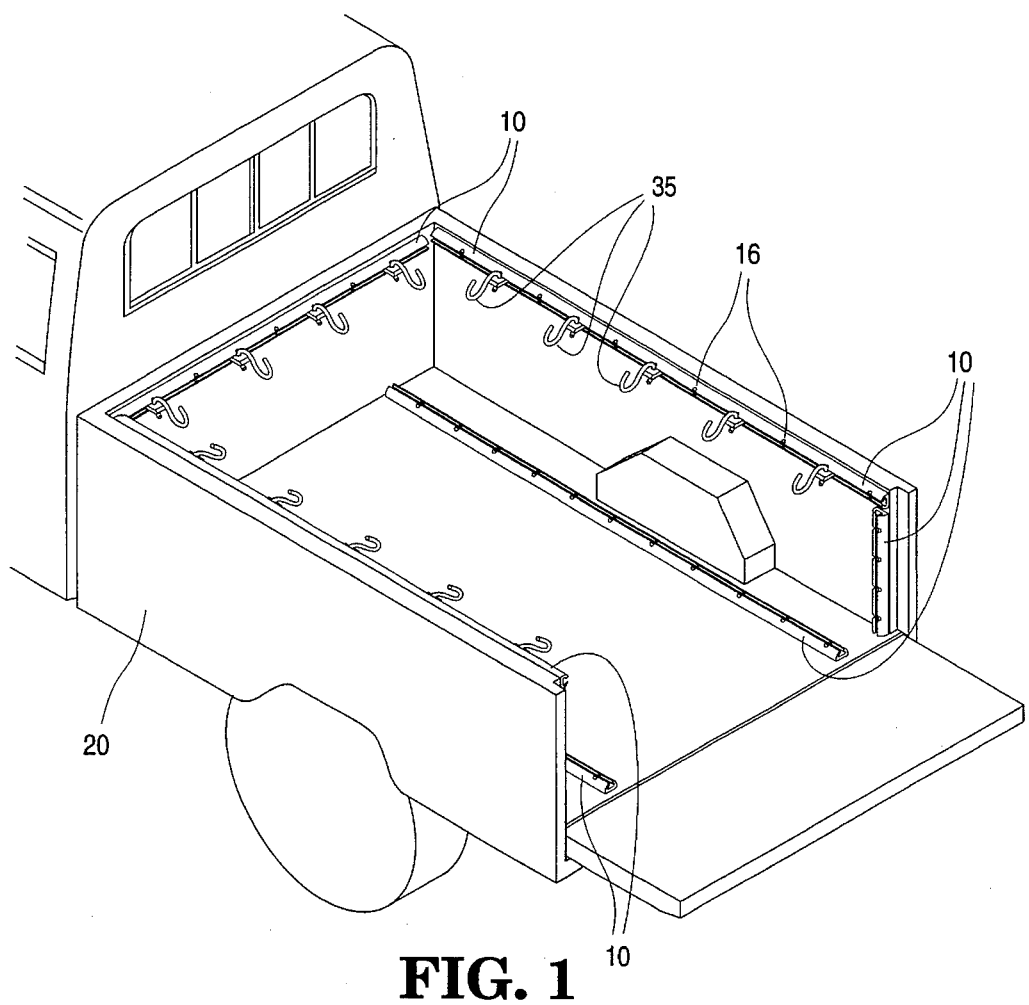
FIG. 1 is a perspective view of a vehicle having a truck bed mounting the payload tie-down system representing the present invention.
Figure 2:
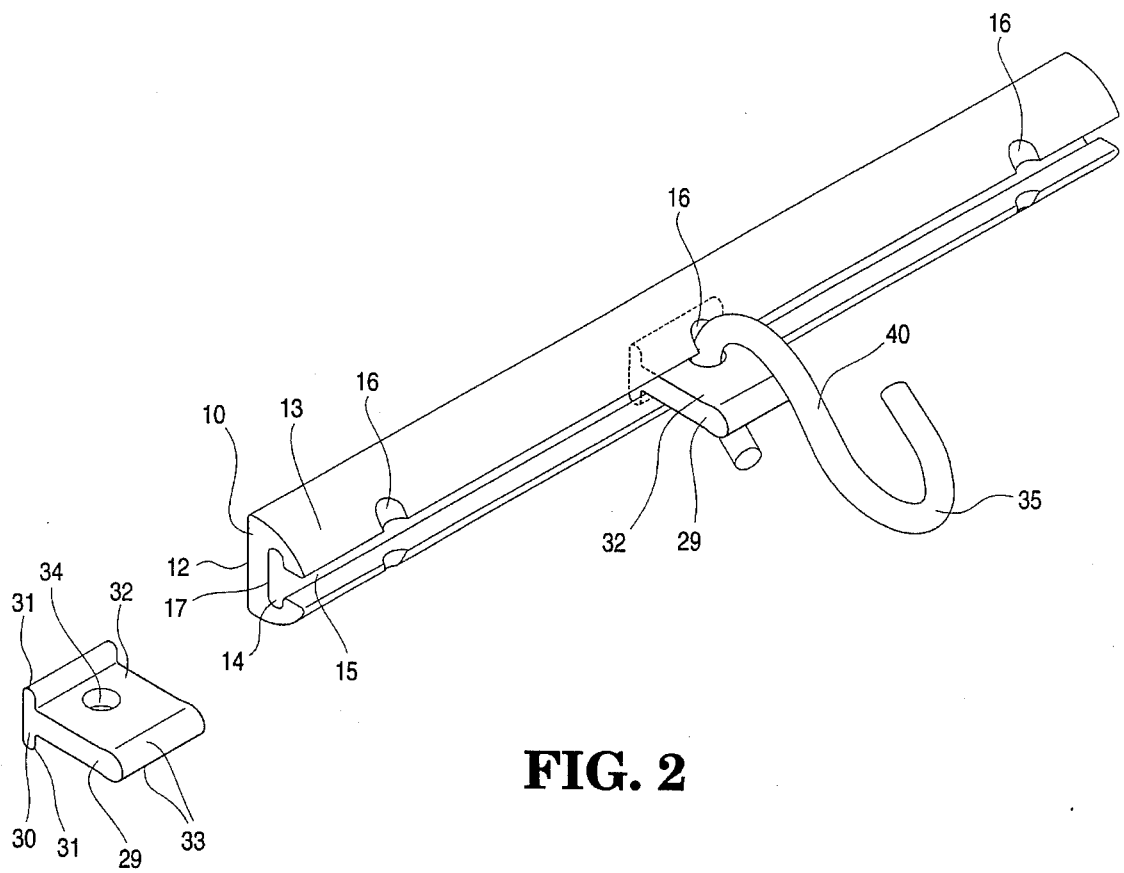
FIG. 2 is an enlarged exploded perspective view of a payload tie-down system representing the present invention.
Figure 3:
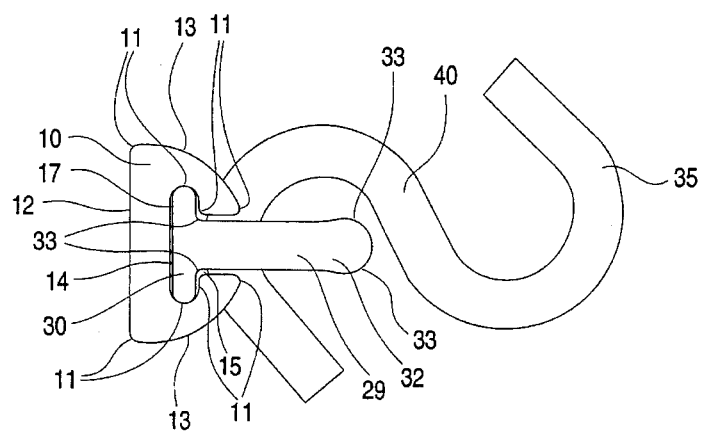
FIG. 3 is an enlarged side view of a payload tie-down system representing the present invention.

Referring now to the drawings for a detailed description of the present invention, reference is first made to FIGS. 1, 2, and 3, depicting elongated generally half-round rod track 10 having track rounded edges 11, planar rear surface 12, curved front surface 13, generally rectangular cross-section slot 15, generally rectangular cross-section channel 14, and circular cross-section notches 16. Slot 15 is disposed longitudinally and symmetrically within track 10 and adjacent and open to front surface 13 so that slot wider sides 16 are normal to rear surface 12. Channel 14 is disposed longitudinally and symmetrically within track 10, interposed between slot 15 and rear surface 12, and adjacent and open to slot 15 so that channel wider side 17 is parallel to rear surface 12. Notches 16 are disposed adjacent to front surface 13 and slot 15 so that the axis of each of notches 16 is parallel to rear surface 12 and normal to track 10. Track 10 may be attached in a variety of positions to a transportation device such as pick-up truck 20 as shown in FIG. 1, for instance by countersunk screws, not shown, disposed through track 10 proximate to channel 14, so that rear surface 12 is proximate to truck 20.

Referring to FIGS. 2 and 3, carriage 29 is formed by generally rectangular channel plate 30, having channel plate rounded edges 31, slidably disposed within channel 14, and generally rectangular slot plate 32 having slot plate rounded edges 33 and retainer hole 34, integral with channel plate 30 and slidably disposed within slot 15. Retainer hole 34 has approximately the same radius as the radius of one of notches 16, and is disposed normally through slot plate 32 so that retainer hole 34 is capable of alignment with each of notches 16 as slot plate 32 and channel plate 30 slide with respect to track 10. Generally S-shaped hook 40 having a cylindrical cross-section of diameter that is slightly less than the diameter of retainer hole 34 is removably disposed through retainer hole 34 and one of notches 16. In this way, relative sliding movement of slot plate 32 and channel plate 30 with respect to track 10 is prevented. A strap, not shown, may be attached to S-shaped hook free end 35, and used to tie-down a payload, as hereinafter described.

In use, the present invention is attached to a transportation device such as pick-up truck 20 as depicted in FIG. 1, for instance, by mounting track 10 with countersunk screws through track 10 proximate to channel 14, so that rear surface 12 is proximate to truck 20. As shown, track 10 may be disposed horizontally along a generally vertical wall or a generally horizontal floor, or vertically along a generally vertical wall. After mounting track 10, carriage 29, formed from channel plate 30 attached to slot plate 32, is slidably disposed within channel plate 14 and slot 15. Carriage 29 is then positioned along track 10 as desired, with retainer hole 34 aligned with one of notches 16. By disposing S-shaped hook 40 through retainer hole 34 and one of notches 16, sliding movement of slot plate 32 and channel plate 30 with respect to track 10 is prevented. Additional carriages 29 may similarly be slidably disposed with in track 10, and thereafter fixed with respect to track 10 by use of additional S-shaped hooks 40. By repeating the preceding procedure with respect to additional tracks 10 mounted to a transportation device, a desired array of S-shaped hooks 40 may be arranged in the transportation device as shown in FIG. 1. A payload may then be tied-down and secured with respect to the transportation device by attaching straps, not shown, between desired S-shaped hook free ends 35 and around, over and about the payload. In this way, payloads of various sizes, shapes and masses may be secured to the transportation device, with the number and placement of S-shaped hooks 40 and straps selected as necessitated by the characteristics of the payload. When a payload of a different size, shape or mass is to be transported, the straps are removed, and S-shaped hooks 40 are removed from retainer holes 34 and notches 16, permitting carriages 29 to be slidably repositioned with respect to track 10, aligning with another of notches 16. Thereafter, S-shaped hooks 40 may be disposed once again through retainer holes 34 and notches 16. By forming track 10 and carriage 29 form a strong, rigid material, and by the presence of track rounded edges 11, channel plate rounded edges 31, and slot plate rounded edges 33 to help prevent regions of likely failure, S-shaped hook 40 may repeatedly exert large pulling forces on carriage 29 and track 10 without structural distortion or failure.

Figure 4:
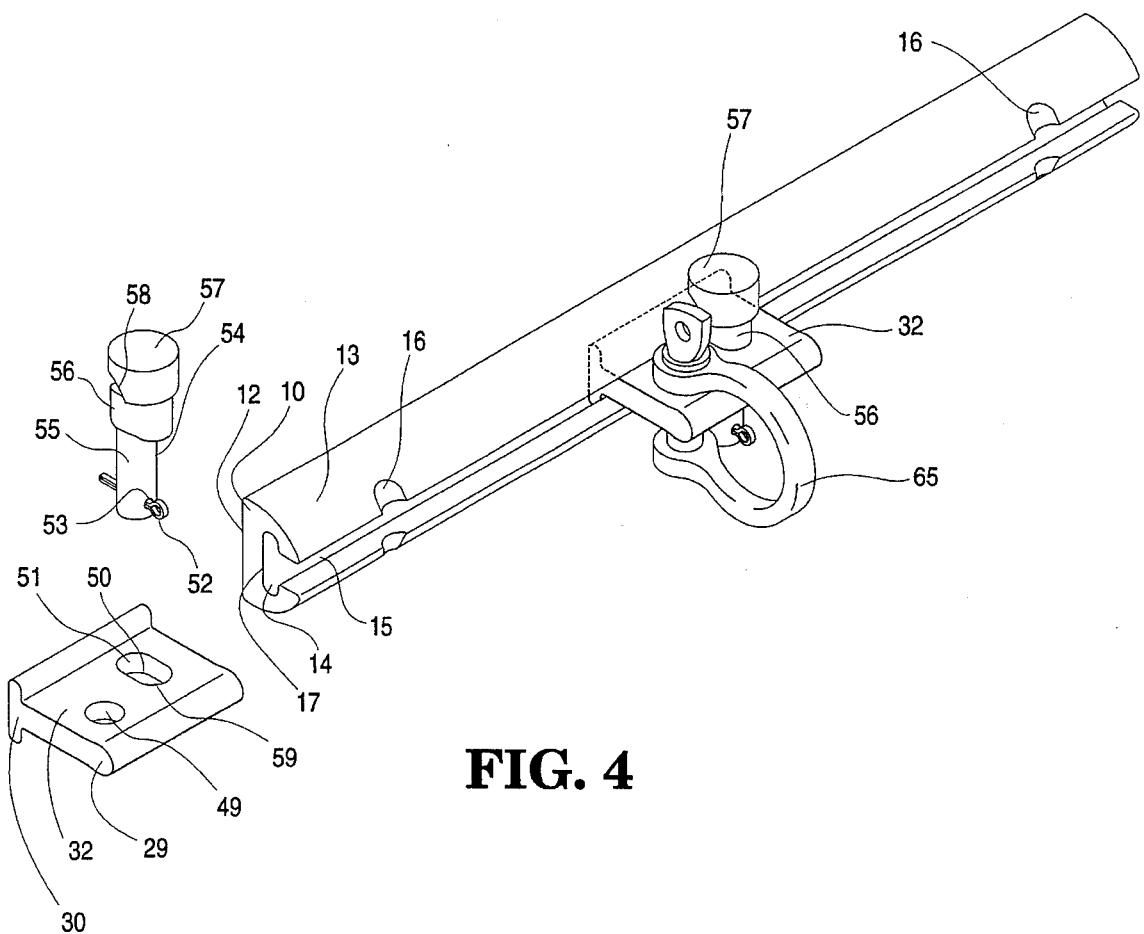
FIG. 4 is an enlarged exploded perspective view of a second embodiment of a payload tie-down system representing the present invention.

In a second embodiment appropriate to those instances where rail 10 is horizontally mounted to a vertical surface, as depicted in FIG. 4, slot plate 32 has oval retainer hole 50, with the minor radius of oval retainer hole 50 chosen to be approximately the same as the radius of one of notches 16. Oval retainer hole 50 is disposed normally through slot plate 32, with the minor axis of oval retainer hole 50 parallel to track 10. Oval retainer hole first side 51, proximate to channel plate 30, is capable of alignment with one of notches 16. Retainer pin 54 has cylindrical portion 55, oval portion 56, and generally cylindrical pin head 57, with the radius of cylindrical portion 55 chosen to be approximately the same as the minor radius of oval portion 56. Oval portion 56 is slightly smaller than oval retainer hole 50, and is interposed coaxially between cylindrical portion 55 and pin head 57. Pin head 57 has arcuate side indentation 58 disposed so that the major axis of oval portion 56 bisects side indentation 58. Retainer pin 54 is disposed through oval retainer hole 50 so that oval portion 56 may be removably disposed within oval retainer hole 50 and one of notches 16, and side indentation 58 engages a portion of front surface 13, preventing sliding movement of carriage 29 with respect to track 10. As will be described, retainer pin 54 is capable of movement with respect to oval retainer hole 50 so that cylindrical portion 55 becomes adjacent to oval retainer hole second side 59, opposing channel plate 30. Cotter pin 52, disposed through cotter pin hole 53, prevents retainer pin 54 from being entirely removed from oval retainer hole 50. Removable strap attachment loop 65 is mounted to slot plate 32 by attachment through attachment loop hole 49. In use, carriage 29 may be slidably repositioned with respect to track 10 by raising retainer pin 54 with respect to slot plate 32 so that cylindrical portion 55 is adjacent to oval retainer hole 50, followed by moving retainer pin 54 away from track 10 so that cylindrical portion 55 is in contact with oval retainer hole second side 59. In this way, retainer pin 54 is disengaged from notch 16 but not removed from carriage 29, permitting sliding movement of carriage 29 with respect to track 10. As carriage 29 reaches the desired position along track 15, retainer pin 34 is moved toward track 10 and is lowered with respect to slot plate 32 so that oval portion 56 partially engages oval retainer hole 55 and another notch 16, and arcuate side indentation 58 engages a portion of front surface 13, again preventing relative sliding movement of carriage 29 with respect to track 10.

Figure 5:
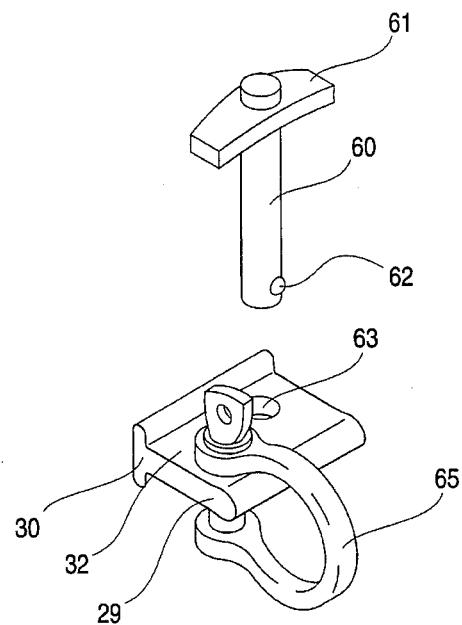
FIG. 5 is an enlarged exploded perspective view of the carriage, cylindrical pin and strap attachment loop of a third embodiment of a payload tie-down system representing the present invention.

In a third embodiment, as shown in FIG. 5, relative sliding movement of slot plate 32 and channel plate 30 with respect to track 10 is prevented by generally cylindrical pin 60 having a flange 61 removably disposable through cylinder pin hole 63. The diameter of cylindrical pin 60 is chosen to be slightly less than the diameter of cylinder pin hole 63. Spring detent 62 prevents cylindrical pin 60 from being removed from cylinder pin hole 63. In a manner entirely similar to the second embodiment of the present invention, removable strap attachment loop 65 is mounted to slot plate 32 by attachment through attachment loop hole 49.

Figure 6:
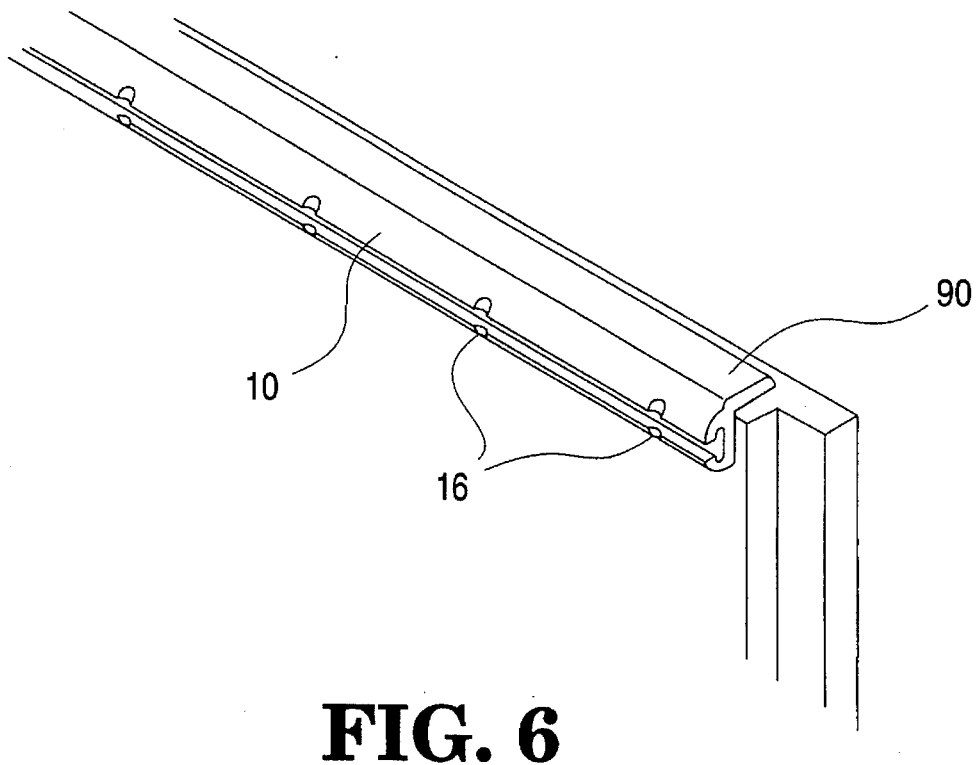
FIG. 6 is a fragmentary, enlarged perspective view of the track of a fourth embodiment of a payload tie-down system representing the present invention.

In a fourth embodiment, as depicted in FIG. 6, elongated, generally planar lower rail 90, integrally formed with track 10, is disposed adjacent to front surface 13 and proximate to rear surface 12 so that the plane of lower rail 90 and rear surface 12 form a right angle. In use, lower rail 90 may be disposed to fit adjacent to the top of a vertical wall, such as the bed wall of a pick-up truck.

Figure 7:
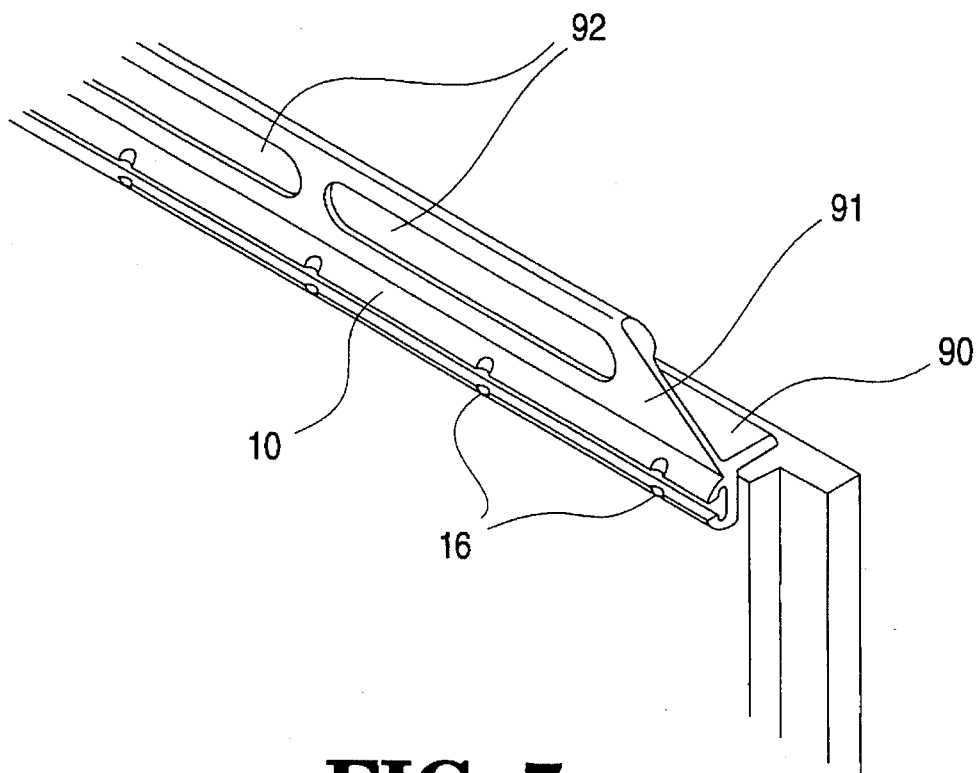
FIG. 7 is a fragmentary, enlarged perspective view of the track of a fifth embodiment of a payload tie-down system representing the present invention.

In a fifth embodiment, shown in FIG. 7, elongated, generally planar upper rail 91 having rail slots 92 and integrally formed with lower rail 90, is disposed opposing track 10 so that the plane of upper rail 91 forms a right angle with respect to lower rail 90 and is parallel to rear surface 12. In use, upper rail 91 may be utilized as an area of attachment for additional ropes, straps or the like by attachment through rail slots 92.

The present invention having been described in its preferred embodiments, it is clear that it is susceptible to numerous modifications and embodiments within the ability of those skilled in the art and without the exercise of the inventive faculty.

What is claimed is:

1. Payload tie-down system for a transportation device, comprising:

an elongated generally half-round rod track having a planar rear surface, a curved front surface, a generally rectangular cross-section slot, a generally rectangular cross-section channel, and a plurality of circular cross-section notches, said slot disposed longitudinally and symmetrically within said track and adjacent and open to said front surface so that wider sides of said slot are normal to said rear surface, said channel disposed longitudinally and symmetrically within said track, interposed between said slot and said rear surface, and adjacent and open to said slot so that wider sides of said channel are parallel to said rear surface, and said notches disposed adjacent to said front surface and said slot so that axes of said notches are parallel to said rear surface and normal to a longitudinal axis of said track;

means for attaching said track to the transportation device so that said rear surface is proximate to the transportation device;

a channel plate slidably disposed within said channel;

a slot plate having a retainer hole, attached to said channel plate and slidably disposed within said slot, said retainer hole having approximately the same radius as the radius of one of said notches and disposed normally through said slot plate so that said retainer hole is capable of alignment with one of said notches;

retainer means, removably disposed through said retainer hole and one of said notches, for preventing relative sliding movement of said slot plate with respect to said track; and strap attachment means, attached to said retainer means.

2. Payload tie-down system for a transportation device as defined in claim 1, wherein said track, said channel plate and said slot plate have rounded edges.

3. Payload tie-down system for a transportation device as defined in claim 2, wherein said channel plate and said slot plate are generally rectangular.

4. Payload tie-down system for a transportation device as defined in claim 2, wherein said retainer means and said strap attachment means comprises a generally S-shaped hook having cylindrical cross-section of diameter slightly less than the diameter of said retainer hole.

5. Payload tie-down system for a transportation device as defined in claim 2, wherein said retainer means comprises:

a generally cylindrical pin, the diameter of said cylindrical pin slightly less than the diameter of said retainer hole; and lock means, for preventing said cylindrical pin from being removed from said retainer hole.

6. Payload tie-down system for a transportation device as defined in claim 2, wherein said strap attachment means comprises a strap attachment loop attached to said slot plate.

7. Payload tie-down system for a transportation device as defined in claim 2, further comprising a rail means integrally formed with said track.

8. Payload tie-down system for a transportation device as defined in claim 7, wherein said rail means comprises:

an elongated, generally planar lower rail defining a lower rail plane and disposed adjacent to said front surface and proximate to said rear surface so that the lower rail plane forms a right angle with respect to said rear surface; and an elongated, generally planar upper rail having a plurality of slots and defining an upper rail plane, said upper rail integral with said lower rail and disposed opposing said track so that the upper rail plane forms a right angle with respect to said lower rail plane and is parallel to said rear surface.

9. Payload tie-down system for a transportation device, comprising:

an elongated generally half-round rod track having rounded edges, a planar rear surface, a curved front surface, a generally rectangular cross-section slot, a generally rectangular cross-section channel, and a plurality of circular cross-section notches, said slot disposed longitudinally and symmetrically within said track and adjacent and open to said front surface so that wider sides of said slot are normal to said rear surface, said channel disposed longitudinally and symmetrically within said track, interposed between said slot and said rear surface, and adjacent and open to said slot so that wider sides of said channel are parallel to said rear surface, and said notches disposed adjacent to said front surface and said slot so that axes of said notches are parallel to said rear surface and normal to a longitudinal axis of said track;

means for attaching said track to the transportation device so that said rear surface is proximate to the transportation device;

a generally rectangular channel plate having rounded edges, said channel plate slidably disposed within said channel;

a generally rectangular slot plate having rounded edges and a retainer hole, attached to said channel plate and slidably disposed within said slot, said retainer hole having approximately the same radius as one of said notches and disposed normally through said slot plate so that said retainer hole is capable of alignment with one of said notches;

a generally S-shaped hook having cylindrical cross-section of diameter slightly less than the diameter of said retainer hole, removably disposed through said retainer hole and one of said notches, for preventing relative sliding movement of said slot plate with respect to said track;

an elongated, generally planar lower rail integral with said track, defining a lower rail plane and disposed adjacent to said front surface and proximate to said rear surface so that the lower rail plane and said rear surface form a right angle; and an elongated, generally planar upper rail having a plurality of slots and defining an upper rail plane, said upper rail integral with said lower rail and disposed opposing said track so that the upper rail plane forms a right angle with respect to said lower rail plane and is parallel to said rear surface.

10. Payload tie-down system for a transportation device, comprising:

an elongated generally half-round rod track having a planar rear surface, a curved front surfaced a generally rectangular cross-section slot, a generally rectangular cross-section channel, and a plurality of circular cross-section notches, said slot disposed longitudinally and symmetrically within said track and adjacent and open to said front surface so that wider sides of said slot are normal to said rear surface, said channel disposed longitudinally and symmetrically within said track, interposed between said slot and said rear surface, and adjacent and open to said slot so that wider sides of said channel are parallel to said rear surface, and said notches disposed adjacent to said front surface and said slot so that axes of said notches are parallel to said rear surface and normal to a longitudinal axis of said track;

means for attaching said track to the transportation device so that said rear surface is proximate to the transportation device;

a channel plate slidably disposed within said channel;

a slot plate having an oval retainer hole, attached to said channel plate and slidably disposed within said slot, said oval retainer hole having minor radius approximately the same as the radius of one of said notches, disposed normally through said slot plate so that the minor axis of said oval retainer hole is parallel to the longitudinal axis of said track and a side of said oval retainer hole proximate to said channel plate is capable of alignment with one of said notches;

a retainer pin having a cylindrical portion, an oval portion, and a generally cylindrical pin heads the radius of said cylindrical portion approximately the same as the minor radius of said oval portion, said oval portion slightly smaller than said oval retainer hole, and interposed coaxially between said cylindrical portion and said pin head, and said pin head having an arcuate side indentation disposed so that the major axis of said oval portion bisects said side indentation, said retainer pin disposed through said oval retainer hole so that said oval portion may be removably disposed within said oval retainer hole and one of said notches, and said side indentation engages a portion of said front surface, for preventing relative sliding movement of said slot plate with respect to said track, and said retainer pin is capable of movement with respect to said oval retainer hole so that said cylindrical portion is adjacent to a side of said oval retainer hole opposing said channel plate;

removable locking means, for preventing said retainer pin from being removed from said oval retainer hole; and strap attachment means, attached to said slot plate.

11. Payload tie-down system for a transportation device as defined in claim 10 wherein said track, said channel plate and said slot plate have rounded edges.

12. Payload tie-down system for a transportation device as defined in claim 11, wherein said channel plate and said slot plate are generally rectangular.

13. Payload tie-down system for a transportation device as defined in claim 11, further comprising a rail means integrally formed with said track.

14. Payload tie-down system for a transportation device as defined in claim 13, wherein said rail means comprises an elongated, generally planar lower rail defining a lower rail plane and disposed adjacent to said front surface and proximate to said rear surface so that the lower rail plane forms a right angle with respect to said rear surface.

15. Payload tie-down system for a transportation device as defined in claim 14, wherein said rail means further comprises an elongated, generally planar upper rail having a plurality of slots and defining an upper rail plane, said upper rail integral with said lower rail and disposed opposing said track so that the upper rail plane forms a right angle with respect to said lower rail plane and is parallel to said rear surface.

* * * * *